United States Patent
Kobelt

[11] 3,818,771
[45] June 25, 1974

[54] TIME-DELAY CAM
[76] Inventor: Jack R. Kobelt, 6110 Oak St., Vancouver, British Columbia, Canada
[22] Filed: Nov. 29, 1972
[21] Appl. No.: 310,355

[52] U.S. Cl. .................................. 74/99, 74/567
[51] Int. Cl. ........................................ F16h 21/44
[58] Field of Search ...................... 74/99, 567, 568

[56] References Cited
UNITED STATES PATENTS
2,007,246  7/1935  Goldberg et al. ..................... 74/567
2,297,090  9/1942  Weaver ................................. 74/567

Primary Examiner—Samuel Scott
Assistant Examiner—Wesley S. Ratliff, Jr.

[57] ABSTRACT

This disclosure pertains to novel means whereby a cam pauses momentarily with respect to a pivotally oscillating cam shaft upon which the cam is mounted. The cam is pivotally mounted on the cam shaft in operative relationship with a cam actuator secured to the cam shaft. A cam follower maintains the cam in a fixed position as the cam shaft and cam actuator pivot in one direction through a predetermined angle, the cam actuator ultimately contacting and impelling the cam in the same pivotal direction. Oscillation of the cam shaft in the opposite pivotal direction impells the cam in the same direction until the cam again becomes pivotally fixed by the cam follower.

7 Claims, 4 Drawing Figures

PATENTED JUN 25 1974 3,818,771

TIME-DELAY CAM

This invention relates to novel structure in devices which are known in the art to which they pertain as cams, to devices wherein a rotating, sliding, or oscillating member imparts motion to a cam follower moving against the edge or face of the cam, and to other such machine elements which produce intermitent or irregular motion and are of the general character of cams.

Cams are classified according to the relative movements of the cam and cam follower and also according to the cam follower itself. One general class includes those cams which move, revolve, or pivot either in the same plane as the cam follower or in a parallel plane. A second general class includes those cams which cause the follower to move in a different plane. A cam follower belonging to either class may move in either a straight line, or in an oscillating arcuate path about a pivot point, and normally has uniform motion or substantially uniformly accelerated motion.

The working surface of a uniform motion cam is shaped such that the cam follower moves at a constant velocity from the beginning to end of its path; such cams are practically limited to relatively moderate cam velocities. A uniformly accelerated motion cam accelerates the cam follower uniformly from beginning to end of its path.

Cams are normally divided, on the basis of their construction, into three types. First, plate cams (also known as disc or peripheral cams) comprise a substantially flat element upon whose contoured peripheral edge a cam follower rides. Second, a face cam resembles a plate cam but the cam follower rides upon the face rather than the periphery. Third, cylinder cams (also known as barrel cams) are cylindrical in shape and the cam follower rides in a groove cut into a cylindrical surface. The type of cam required in any given application, be it uniform motion, uniform acceleration, plate, face, or cylinder, normally depends upon the dynamic conditions and the mechanical motion required.

Oscillating cams in the present state of the art are such that the movement of the cam follower follows an identical path in both directions. If, for instance, a cam follower movement X were rectilinearly plotted against a cam rotation angle Y, a single X – Y curve thus formed would represent the relationship between cam and cam follower movement in both directions of cam oscillation. In my invention herein disclosed, the X – Y curve is not the same in both directions of cam oscillation. For example, the cam follower may move uniformly with the cam in one direction of cam oscillation, pause momentarily as the direction of cam oscillation is reversed, then move rapidly to the original starting relationship; in such an example, the X – Y plot would form a three-sided figure, one side representing cam oscillation in one direction and the two other sides representing cam oscillation in the other direction. In this manner, a time-delay may be introduced at the beginning of cam oscillation in either or both directions.

My invention of an oscillating time-delay cam may be used in any mechanical device wherein a cam follower requires a movement in one direction which differs from that in the other direction. Specifically, my invention is presently used in an Automatic Sequencing Control (my co-pending Canadian Pat. application No. 133,465, and U.S. Pat. application No. 221,881) wherein an engine throttle boost is applied gradually as a cam shaft oscillates in one direction, the throttle boost is maintained through a finite portion of cam shaft oscillation in the other or return direction, and the throttle boost is dumped rapidly at a predetermined point in the return oscillation.

Therefore, it is one object of my invention to provide a time-delay cam wherein a pivotally oscillating cam produces cam follower motion in one direction which differs from that in the other direction.

It is a further object of my invention to provide a time-delay cam wherein a cam follower serves as a detent mechanism whereby to retain a cam in a dwell position.

Still a further object of my invention is to provide a time-delay cam wherein an adjusting means is provided whereby the pivotal relationship between a cam and cam shaft may be altered, thus providing fine control of the cam follower motion.

Yet another object of my invention is to provide a time-delay cam assembly in which a cam, cam actuator, and cam shaft are combined in a novel and simple mode of construction.

These and further objects of my invention, which reside in the details of its structure and operation, will be evident from a study of the following disclosure and the accompanying drawings which illustrate a preferred embodiment of invention. This embodiment is merely exemplary and is not intended to detract from the full scope of the invention as set out in the annexed claims.

In the drawings, wherein like numerals refer to like parts:

Figures 1, 2:
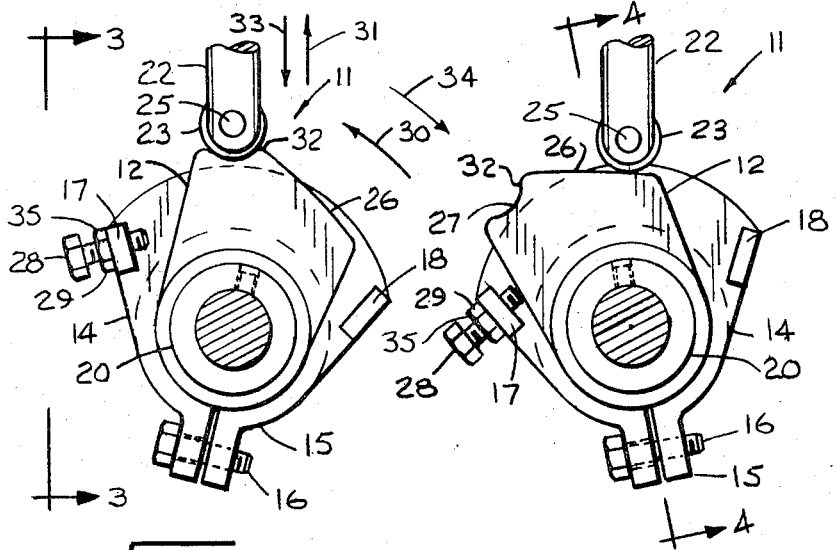
FIG. 1 is a frontal elevation of my invention depicting a cam, cam shaft, cam actuator, and cam follower operatively mounted on a frame structure not shown, the cam being in the dwell position.
FIG. 2 is another frontal elevation of my invention in which the cam is in one phase of actuation of the cam follower.
Figures 3, 4:
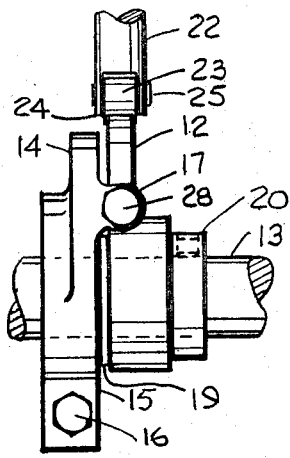
FIG. 3 is a side elevation of my invention taken substantially along line 3—3 in FIG. 1.
FIG. 4 is a sectional elevation of my invention taken substantially along line 4—4 in FIG. 2.

Turning now to the drawings, FIGS. 1, 2, 3 and 4 illustrate a time-delay cam assembly 11 in which cam means 12 is pivotally mounted on cam shaft 13; cam shaft 13 is pivotally mounted on a frame means not shown but will readily be understood by one skilled in the art to be any operative portion of an engine block, control assembly frame, or other such mechanical component. Cam actuator means 14 is secured to shaft 13 by means of split hub 15 and positioning bolt 16. Cam 12 is retained between actuator ears 17 and 18 of cam actuator 14 by spacer washer 19, shaft collar 20, and set-screw 21. Clearly, cam 12 and spacer washer 19 are pivotally mounted on shaft 13; cam actuator 14 and collar 20 are secured to shaft 13.

Cam follower means 22 interfaces cam 12, is impelled in direction 33, and may be either slidably or pivotally mounted on a frame means for substantially radial movement with respect to cam shaft 13. Roller 23, rotatably mounted at the end 24 of cam follower 22 by means of pin 25, projects therefrom and serves as a detent member. Roller 23 rolls on peripheral contour 26 of cam 12 and rests in cam indentation 27 in the cam dwell position as shown in FIG. 1.

Positioning bolt 16, being used to locate and fix cam actuator 14 on shaft 13, may also be used to adjust the pivotal position of cam actuator 14 with respect to shaft 13. Adjusting means 35 comprising bolt 28 threaded into cam actuator ear 17 serves to determine the angular movement of cam 12 with respect to cam actuator 14; lock nut 29 fixes the position of bolt 28. Clearly, bolts 16 and 28 determine the functional motion of cam follower 22 with respect to shaft 13 as well as length of its dwell period.

Turning now to the operation of my invention, FIG. 1 shows cam 12 in its dwell position. As shaft 13 and cam actuator 14 oscillate through a predetermined angle in direction 30, actuator ear 18 eventually contacts cam 12 and forces cam follower 22 in direction 31 an amount determined by the nature of shoulder 32 and then moves quickly in direction 33 forcing cam 12 against adjusting bolt 28, cam follower 22 ultimately coming to rest at the end of the pivotal movement of shaft 13 substantially as shown in FIG. 2. When shaft 13 and actuator 14 are pivoted in direction 34, cam follower 22 moves in direction 31 until it once again seats in cam indentation 27, i.e., the cam dwell position.

In practice, shoulder 32 need not be large. However, initial movement of cam follower 22 in direction 31, occuring as roller 23 is unseated from indentation 27, should be taken into account in any mechanical device wherein my invention is to be used.

It is believed that my invention of a time-delay cam will have been clearly understood from the foregoing detailed description of the structure and operation of my now preferred embodiment. Various modifications, changes, additions, and equivalents may be resorted to in view of these teachings by one skilled in this art without departing from the spirit of my invention. For instance, it will be clear to one skilled in the art that my invention may embody an indentation 27 at each end of cam contour 26, thus providing a dwell period or time-delay at each end of oscillitory motion of shaft 13. A variety of cam contours may be used in combination with indentation 27. A detent mechanism other than cam follower 22 might be employed to retain cam 12 in its dwell position. Adjustment means 35 may be employed in both of actuator ears 17 and 18. Cam means 12 may be of either plate, face, or cylinder class, cam follower means 22 and its mounting on a frame means being merely a choice of design. Therefore, whereas a choice between the foregoing variations, modifications, changes, additions, and equivalents falling within the true scope of my invention will depend largely upon the circumstances in which my invention is used, it is my express intention that no limitations be implied and that the hereto annexed claims be given the broadest interpretation to which the language fairly admits.

The embodiments of the invention in which an exclusive property or privilege is claimed are defined as follows:

1. A time-delay cam assembly comprising a cam shaft, cam means pivotally mounted on said cam shaft, cam actuator means secured to said cam shaft, cam follower means reciprocated by said cam means, detent means operatively mounted on said cam follower means and interacting with said cam means, whereby said detent means maintains momentarily said cam means in a fixed position as said cam shaft and said cam actuator means pivot through a predetermined angle.

2. A time-delay cam assembly as defined in claim 1 wherein said detent means including a projection mounted on said cam follower means and an indentation on said cam means matching substantially the contour of said projection.

3. A time-delay cam assembly as defined in claim 1 wherein said detent means including a roller rotatably mounted on said cam follower means, said cam follower means continually impelled against said cam means, said cam means having an indentation matching substantially the contour of said roller.

4. A time-delay cam assembly as defined in claim 1 wherein said cam follower means is slidably mounted on said frame means and impelled toward said cam means, said cam means having an indentation matching substantially the contour of said detent means.

5. A time-delay cam assembly as defined in claim 1, wherein adjustment means mounted on said cam actuator means permits angular adjustment of said cam actuator means with respect to said cam shaft.

6. A time-delay cam assembly as defined in claim 1, wherein adjustment means mounted on said cam actuator means permits angular adjustment of said cam means with respect to said cam actuator means.

7. A time-delay cam assembly comprising a cam shaft, cam means pivotally mounted on said cam shaft, cam actuator means secured to a cam shaft, cam follower means operatively mounted for motion imparted by said cam means, said cam follower means continually impelled toward said cam means, detent means operatively mounted on said cam follower means, said cam means having an indentation matching substantially the interface contour of said cam follower means, whereby said detent means maintains momentarily said cam means in a fixed position as said cam shaft and cam actuator means pivot through a predetermined angle.

* * * * *